Nov. 24, 1959  F. T. GUTMANN  2,914,597
CLOSURE
Filed April 12, 1957
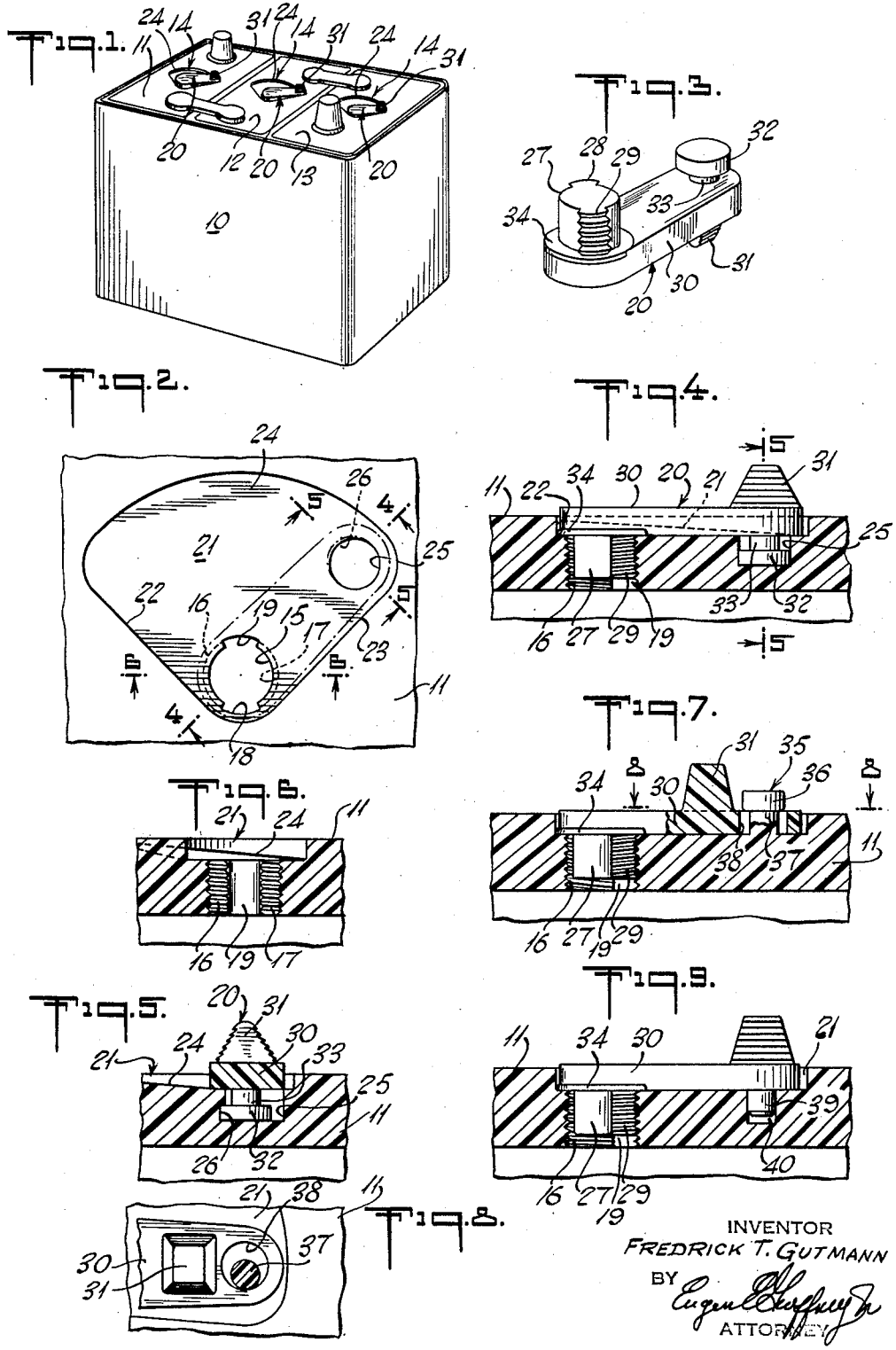
INVENTOR
FREDRICK T. GUTMANN
BY
ATTORNEY

United States Patent Office 2,914,597
Patented Nov. 24, 1959

2,914,597

CLOSURE

Fredrick T. Gutmann, West Caldwell, N.J.

Application April 12, 1957, Serial No. 652,456

9 Claims. (Cl. 136—170)

This invention relates to a closure for receptacles and more specifically to a new and improved closure that is particularly useful, among other things, for closing the filler openings of storage batteries.

Closure devices heretofore suggested for closing filler openings on batteries and for other similar purposes have generally utilized a conventional threaded plug requiring rotation of two or more revolutions to secure them in place. Furthermore these prior devices had to be tightly seated to prevent them from being jarred loose with the result that they were often difficult to remove after remaining in place for extended periods of time.

Accordingly one object of the invention resides in a novel and improved closure for storage batteries and other purposes that overcomes the disadvantages of prior devices, can be quickly and easily installed and removed and at the same time securely locked in place so that even severe vibration will not loosen it.

Another object of the invention is a novel and improved closure cap and receiver that is characterized by its dependability, simplicity, relatively low cost and ease of coupling and disengagement.

A further object of the invention resides in the provision of a novel and improved closure for storage battery cells and other purposes.

The above and other objects and advantages of the invention will become more evident from the following description and accompanying drawings forming part of this application.

In the drawings:

Fig. 1 is a perspective view of a storage battery embodying closures in accordance with the invention;

Fig. 2 is a plan view of a single closure as shown in Fig. 1 and with the removable closure member illustrated in dotted outline;

Fig. 3 is a perspective view of the removable member shown in Figs. 1 and 2;

Figs. 4, 5 and 6 are cross sectional views of Fig. 2 taken along the lines 4—4 through 6—6 thereof;

Fig. 7 is a cross sectional view similar to Fig. 4 showing a modified embodiment of the invention;

Fig. 8 is a cross sectional view of Fig. 7 taken along the line 8—8 thereof; and Fig. 9 is a cross sectional view of another embodiment of the invention.

The closure in accordance with the invention provides means for quickly and easily closing and opening a cotainer and at the same time locking the closure means in position on the container so that the vibration or jarring of the container will not accidentally loosen it. While the invention is generally useful, it is particularly applicable to storage batteries for closing the openings in the individual cells and accordingly the invention will be described in connection with that application.

Reference is now made to the drawings and more specifically to Figs. 1–6 illustrating one embodiment of the invention as applied to a conventional storage battery 10 as shown in Fig. 1. Each of the cells 11, 12 and 13 have central openings for servicing the battery and these openings are sealed by individual closure means generally denoted by the numeral 14.

In accordance with the invention the top of each cell such as cell 11 is provided with an opening 15 having opposite threaded wall sections 16 and 17 as shown in Fig. 2. These threaded portions 16 and 17 preferably form part of a continuous thread with arcuate sections 18 and 19 removed to facilitate insertion and engagement of the closure plug generally denoted by the numeral 20. The opening 15 is disposed in the vicinity of the vertex of a recess 21 generally in the shape of a sector and of an angular width coordinated with the threaded sections 16 and 17 and with the plug 20 so that the sides 22 and 23 of the recess will define the opened and closed positions of the closure plug 20 as will be described. The bottom 24 of the recess 21 preferably slopes relative to the surface of the container or cell 11 with the shallowest portion adjoining the edge 22 of the recess 21 and the deepest portion adjoining the edge 23. The slope of this recess will be observed more clearly in Fig. 6 of the drawings. Recess 21 further includes a well 25 adjoining the edge 23 and having an undercut portion 26 which cooperates with the closure plug 20 to hold the latter in the closed position.

The closure plug 20 as shown in Fig. 3 includes a generally cylindrical member or plug 27 having diametrically opposite threaded portions 28 and 29. The angular width of these threaded portions is preferably made slightly less than the angular width of the cut-out portions 18 and 19 in the wall of the container opening 15 and the threads are arranged to cooperate with the threaded sections 16 and 17. While the threaded sections 28 and 29 of the plug 20 are of smaller angular width than the threaded sections 16 and 17 formed in the wall of the opening 15 they may be of any desired angular width provided however that the cut-out portions 18 and 19 in the opening 15 are always slightly greater than the angular width of the threads 28 and 29.

The threaded member 27 is carried by an arm or lever 30 extending outwardly from the member 27 and is substantially perpendicular to the axis thereof. A resilient washer 34 surrounds the closure plug 27 at its point of joinder to the arm 30 to act as a gasket in the sealing operation. The outer end of the arm 30 includes a finger hold 31 on the top side thereof and a disk-like latching member 32 is secured to and spaced from the underside of the arm by means of an intermediate spacer 33 of slightly smaller diameter than the disk-like member 32. The diameter of the member 32 is made slightly smaller than the diameter of the opening or well 25 so that it may be inserted into the well and engage the undercut portion 26 to lock the closure in position on the cell. In addition the arm 30 is preferably made of a flexible material of plastic, rubber or the like so that it can be readily deflected for insertion of the closure.

To insert the closure 20 into the opening 15 one side of the arm 30 is generally aligned with the recess edge 22 to automatically register the threaded sections 28 and 29 of the plug with the cut-out portions 17 and 18 of the opening 15. The plug member 27 is then pushed into the opening until it is properly seated whereupon the arm 30 is moved in a clockwise direction as shown in Fig. 2 through the aid of finger hold 31 until the latching member 32 engages the opening 25. This rotary action causes the threaded sections 28 and 29 to engage the threaded sections 17 and 16 respectively to tighten the plug member 27 in the opening 15. By properly coordinating the elements, the plug member 27 can be arranged to be firmly seated by movement of the arm through an angle slightly less than that required to bring the latching member 32 in alignment with the opening 25. Inasmuch as the arm 30 is made of a resilient material it can be slightly deflected to bring the latching disk in line with the opening 25 whereupon insertion of the latching disk into the opening will cause the latch 32 to engage the undercut portion 26 of the well 25 so that the closure will be firmly locked in place.

A modified embodiment of the locking means is shown in Figs. 7 and 8. In this embodiment like numerals have been used to define corresponding elements as described in connection with Figs. 1–6. In some applications it may be found desirable to eliminate the well 25 as shown in Fig. 2. In such cases this well may be replaced by a locking member generally denoted by the numeral 35 and including a disk-like member 36 carried by a narrower neck portion 37 similar in construction to the locking disk 32 and the supporting neck 33 shown in Fig. 3. With this arrangement the finger hold 31 is displaced inwardly from the position shown in Fig. 3 and the outer end of the arm 30 is provided with an opening 38 adapted to receive and engage the locking means 35 in substantially the same manner as described in connection with the embodiment of the invention shown in Figs. 1–6.

A still further embodiment is shown in Fig. 9 which corresponds to the embodiment in Figs. 1–6 except that the locking means of Fig. 9 is in the form of a generally cylindrical pin 39 which slidably cooperates with a well 40 in the base of the recess 21.

With the invention as described above a dependable closure is provided for containers such as storage battery cells and the like that may be quickly and easily inserted and removed and at the same time keep securely locked in position. Moreover by reason of the utilization of the lever 30 a tighter seal can be obtained and at the same time the added leverage greatly facilitates removal of the closure even after remaining in place for extended periods of time and in the presence of corrosive materials such as the acids as used in storage batteries.

While only one embodiment of the invention has been illustrated and described it is apparent that modifications, alterations and changes may be made without departing from the true scope and spirit thereof as defined by the appended claims.

What is claimed is:

1. The combination with a container having an opening therein of means for closing said opening comprising a closure member, cooperating means on said closure member and said opening snugly holding said closure in said opening upon relative rotation through a predetermined angle not exceeding 180°, a lever carried by said closure and extending outwardly from and generally perpendicular to the axis of rotation of said closure and cooperating means carried by said container and said lever for holding said closure in engagement with said opening.

2. The combination according to claim 1 wherein the first said cooperating means comprise cooperating threaded sectors each having an angular width of approximately 90°, said closure being held in said opening by relative rotation not exceeding 90°.

3. The combination according to claim 2 wherein said container includes a sectoral recess for receiving said lever, the edges of said recess defining the engaged and disengaged positions of said closure and opening.

4. The combination according to claim 3 wherein said recess has a tapered depth with the degree of taper being substantially equal to the pitch of said threads.

5. The combination according to claim 1 wherein said lever is formed of a resilient material and the last said cooperating means includes an undercut recess in said container and a latch on said lever adapted to be received in and engage the undercut portion of said undercut recess.

6. The combination according to claim 1 wherein said lever is formed of a resilient material and the last said cooperating means includes an opening in said lever and latch means carried by said container for engagement with said lever opening.

7. The combination with a container having an opening therein of means for closing said opening comprising a closure member, cooperating means on said closure member and said opening snugly holding said closure in said opening upon relative rotation of said plug through a predetermined angle not exceeding 180°, a lever of relatively flexible material carried by said closure and extending outwardly from and generally perpendicular to the axis of rotation of said closure, and means carried by said container for receiving said lever and defining the open and closed positions of said closure, the last said means being in the form of a sectoral recess in said container with the container opening disposed in the vicinity of the vertex of said sectoral recess.

8. A top closure member for a storage battery cell comprising a relatively flat plate having a filler opening therein and a sectoral recess having an angular width of approximately 90 degrees with said opening positioned within the apex of said recess, a pair of oppositely disposed threaded sectors formed in the wall of said opening including recessed portions separating the threaded sectors one from the other and having a depth exceeding the depth of the threads, a closure plug having a pair of threaded sectors having an angular width corresponding to the angular width of the recessed wall portions of said opening, said threaded sectors on said plug cooperating with the threaded sectors in said opening upon rotation of the plug to secure the plug in said opening, a lever of flexible material extending outwardly from and carried by said plug and angularly aligned with said threaded sectors to position one edge of said lever adjoining one edge of said sectoral recess when the plug is inserted in said opening and to move the threads on said plug into engagement with the threads on said opening when the opposing edge of said lever is moved to a position adjoining the other edge of said sectoral recess and cooperating latching elements carried by said sectoral recess and the other end of the said lever for locking the lever and plug in the closed position.

9. A top closure member for a storage battery cell according to claim 8, wherein the bottom of said sectoral recess is tapered with the degree of taper being coordinated with the pitch of said threads on the plug and opening to cause the lever to slidably engage the bottom of said recess during angular movement in engaging and disengaging said plug in said opening.

References Cited in the file of this patent

UNITED STATES PATENTS

| 1,387,350 | Chamberlain | Aug. 9, 1921 |
| 2,220,005 | Smith | Oct. 29, 1940 |

FOREIGN PATENTS

| 436,761 | Great Britain | Oct. 17, 1935 |